June 2, 1964
L. W. BOOTH
3,135,081
LAWNMOWER
Filed July 25, 1962
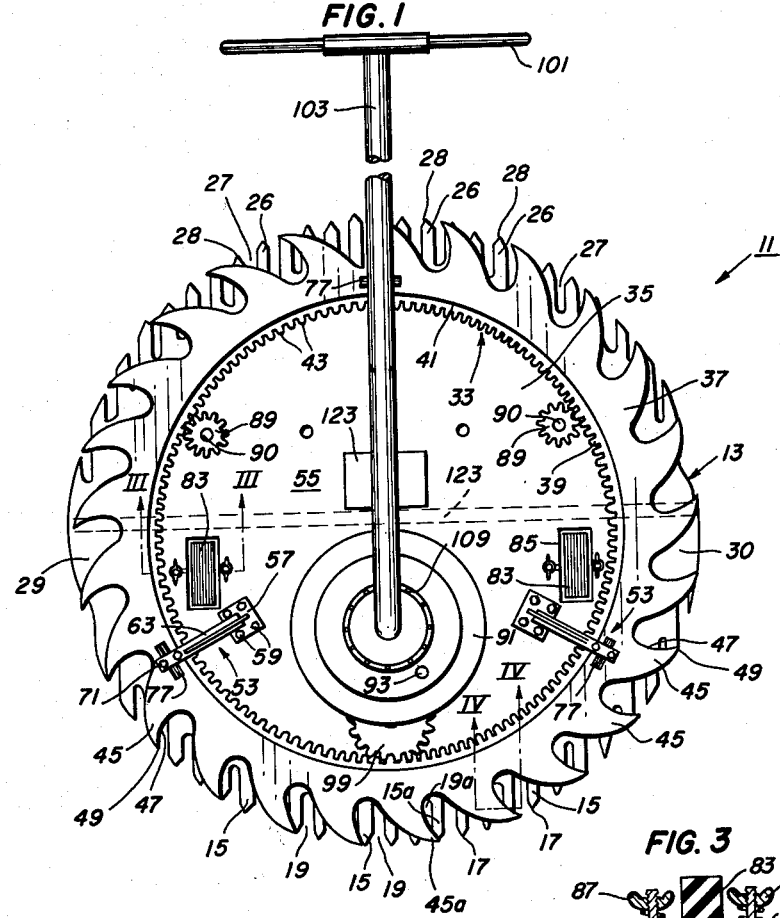
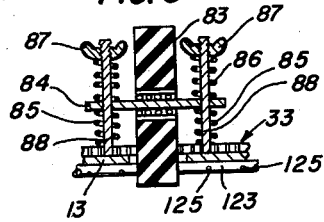
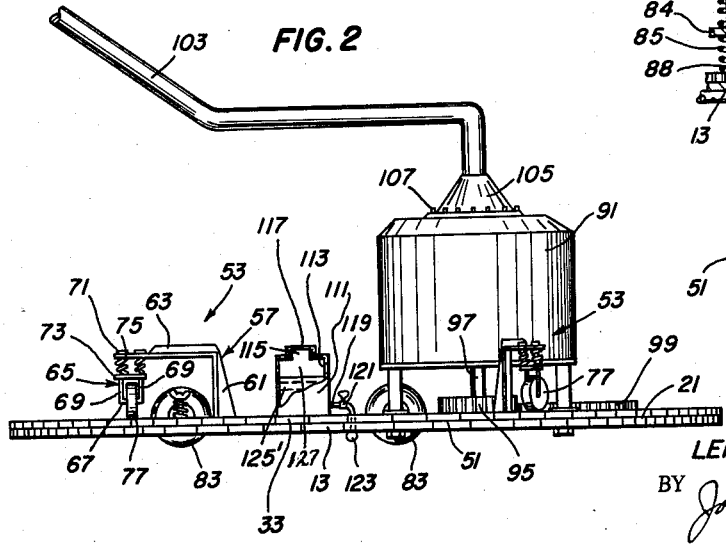
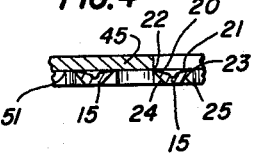
INVENTOR.
LENDON W. BOOTH
BY John R. Walker, III
Attorney United States Patent Office 3,135,081

Patented June 2, 1964

3,135,081
LAWNMOWER

Lendon W. Booth, 943 Semmes, Memphis, Tenn.
Filed July 25, 1962, Ser. No. 212,383
2 Claims. (Cl. 56—25.4)

This invention relates to a lawnmower for cutting grass and the like.

One of the objects of the present invention is to provide an improved lawnmower that is highly efficient in operation.

A further object is to provide a self-sharpening lawnmower.

A further object is to provide a lawnmower that has a unique and improved arrangement of the parts thereof in which the motor, wheels and other parts are mounted on a base plate centrally of a rotating annular blade.

A further object is to provide improved cutting means having a positive cutting action as compared with the conventional type of rotary lawnmower in which a blade rotates.

A further object is to provide such cutting means that includes a plurality of forwardly extending teeth adjacent the forward part of the base plate, a plurality of rearwardly extending teeth adjacent the rearward part of the base plate, and a plurality of arcuate teeth carried in a circular motion in co-acting relationship with said forwardly and rearwardly extending teeth.

A further object is to provide a lawnmower which has low r.p.m. so that there is no danger of rocks and the like being thrown.

A further object is generally to improve the design and construction of lawnmowers.

The means by which the foregoing and other objects of the present invention are accomplished and the manner of their accomplishment will be readily understood from the following specification upon reference to the accompanying drawings, in which:

FIG. 1 is a plan view of the lawnmower of the present invention.

FIG. 2 is a side elevational view thereof with the handle being broken away.

FIG. 3 is an enlarged fragmentary sectional view taken as on the line III—III of FIG. 1.

FIG. 4 is a further enlarged fragmentary sectional view taken as on the line IV—IV of FIG. 1.

Referring now to the drawings in which the various parts are indicated by numerals, the lawnmower 11 of the present invention comprises a substantially circular base plate 13, which is preferably formed from a flat and relatively thin piece of metal and which is horizontally disposed when assembled with the lawnmower. Base plate 13 is provided adjacent the forward part thereof with a plurality of forwardly extending teeth 15. Teeth 15 are preferably cut out from the material of base plate 13 so that the distal ends 17 of the teeth are arranged in an arc. Teeth 15 are laterally spaced apart as at spaces 19 and the teeth are pointed adjacent the distal ends 17 thereof, as best seen in FIG. 1. Each of teeth 15 is dished out or hollowed out on the upper surface thereof to provide surfaces 20, 21 that are oppositely and upwardly inclined from adjacent the middle of the tooth towards the sides thereof where the surfaces 20, 21 respectively terminate in laterally spaced sharpened edges 22, 23 at the junctures with the upwardly inclined lower surfaces 24, 25 of the tooth. A plurality of rearwardly extending teeth 26, spaced apart as at 27, are provided adjacent the rearward part of base plate 13 and are similar in construction to forwardly extending teeth 15. It will be seen from FIG. 1 that the distal ends 28 of teeth 26 and the distal ends 17 of teeth 15 establish, with the exception of portions 29, 30 on the opposite sides of the base plate, 13, substantially the entire peripheral outline of the base plate 13 and which outline is substantially a circle.

A rotor blade or annular member 33 having an enlarged central opening 35 and having an outside diameter substantially the same as the diameter of the circular outline of base plate 13 is rotatably mounted on top of base plate 13. Annular member 33 includes an annular plate 37 and an annular gear 39 which is fixedly attached to the inner periphery 41 of plate 37 and which gear has its teeth 43 extending radially inwardly. Annular plate 37 is provided with a plurality of arcuate teeth 45 on the outer periphery thereof which are spaced therearound and which are curved towards the direction of rotation of annular member 33. Thus, the teeth 45, shown in the drawings, are curved in a counterclockwise direction, as viewed in FIG. 1, so that annular member 33 is adapted to be rotated in a counterclockwise direction, although it will be understood that the annular member may be rotated in the opposite direction and the teeth 45 curved in the opposite direction, without departing from the spirit and scope of the present invention. The leading edge 47 of each tooth 45 sweeps arcuately back from the tip 49 of each tooth and is arranged so that the tip is the first part of the tooth that co-acts with or engages each of the teeth 15, 23. Thus, the grass or the like is entrapped in the space 19 or 27 between the leading edge 47 and each tooth. For example, in referring to FIG. 1, it will be seen that the particular tooth 45*a* has its tip in engagement with tooth 15*a* so that the space 19*a* is completely surrounded. From the foregoing, it will be seen that there is a positive action which insures that the grass will definitely be cut and there is no dependency on the centrifugal force of the cutting edge to cut the grass. For example, in the conventional rotary type of lawnmower which has a high-speed rotating blade, many times the blade will simply push the grass out of the way without cutting the grass, particularly when the blade is dull or the grass is tough.

It should be noted that the flat lower surface 51 of teeth 45 slidably engages the sharpened edges 22, 23 of teeth 15 and also the corresponding sharpened edges of teeth 26 so that self-sharpening of the teeth is provided as the lawnmower is used. As the surfaces of the co-acting teeth 45 and teeth 15, 26 are worn down, the teeth will be kept in sliding engagement by means of the hold-down assemblies to be described hereinafter.

A plurality of hold-down assemblies 53 are mounted on the central portion 55 of base plate 13, with the central portion being that portion of the base plate which is exposed through central opening 35 or, in other words, that portion of the base plate inwardly of gear 39. The hold-down assemblies 53 are substantially identical and the following description of one will suffice for all. Hold-down assembly 53 comprises a bracket 57 that is fixedly attached to base plate 13 as by bolts 59 or the like and includes an upstanding portion 61 and an arm 63 integrally attached adjacent the upper end of upstanding portion 61 and extending outwardly therefrom. A carriage 65 is movably supported adjacent the outer end of arm 63 for vertical movement and includes an axle 67 and a plurality of rod-like members 69 fixedly attached to axle 67 adjacent the lower ends thereof and extending upwardly through apertures in arm 63 where the members 69 are provided with threaded portions upon which are threadedly engaged nuts 71. A transverse plate 73 is fixedly attached to rod-like members 69 intermediate the ends thereof and springs 75 respectively surround the rod-like members and extend between the upper face of plate 73 and the lower face of arm 63 so that the carriage 65 is urged downwardly. A roller 77, preferably having central ball bearings and race, not shown, is mounted on axle 67. Roller 77 rollingly engages the upper surface of annular plate 37 in the space between teeth 45 and inner periphery 41 which forms an annular track 81 for the roller. Axle 67 is aligned radially relative to the base plate 13 and annular member 33 so that roller 77 will turn easily. Thus, it will be understood that springs 75 urge rollers 77 downwardly which, in turn, urges annular plate 37 downwardly against base plate 13 to take care of any wear of the parts and to make possible the sharpening feature heretofore mentioned.

A plurality of wheels 83 are mounted from base plate 13 and extend below the base plate through openings 85 provided in the base plate so that the lawnmower 11 is supported for rolling movement over the ground. Wheels 83 are each preferably resiliently mounted as by means of an axle member 84 upon which the wheel is mounted and which is supported between two pairs of springs, a lower pair 85 that extend between the opposite ends of the axle member and base plate 13, and an upper pair 86 that extend between the opposite ends of the axle member and wing nuts 87. Rods 88 are fixedly attached to base plate 13 and respectively extend upwardly through springs 85, through apertures in the opposite end of axle member 84, and through springs 86 where they are threaded and have wing nuts 87 engaged thereon.

A pair of spacer gears 89 are rotatably mounted from base plate 13 for rotation about a vertical axis as by means of a vertical spindle 90. Gears 89 engage annular gear 39 to help keep the annular member 33 in concentric relationship relative to base plate 13. Also, if desired, gears 89 may be coupled to wheels 83 by suitable well known means, not shown, for driving the lawnmower 11.

A motor 91, which is preferably an electric motor adapted to be started by the usual means, as by a switch button 93, provides the motor means for driving annular members 33. The connection between motor 91 and annular member 33 is preferably by means of a driving gear 95 fixedly attached to the vertical motor shaft 97 and which gear 95 engages an intermediate gear 99 which, in turn, engages annular gear 39. The above mentioned gear arrangement and the speed of motor 91 is such that annular member 33 rotates at low r.p.m. as for example, approximately 200 r.p.m.

A handle 101 for pushing lawnmower 11 is preferably attached adjacent one end of a handle support 103 that is attached adjacent the opposite end preferably to motor 91 as by means of a mounting member 105. The means for attaching mounting member 105 preferably comprises a plurality of equally spaced upstanding pins 107 attached to the top of motor 91 and extending through apertures 109 in the mounting member. This construction makes it possible to vary the angle of handle support 103 relative to the other parts of the lawnmower 11. It will be understood that this angle may be changed by lifting up on handle support 103 to raise mounting member 105 until pins 107 are free from apertures 109, then rotating handle support 103 about a vertical axis through the center of the mounting member until the apertures are respectively in alignment with the next adjacent pins or other pins depending upon the extent of the angle desired, and finally the handle support is lowered to extend the pins through the apertures.

A liquid fertilizer system is preferably provided in combination with lawnmower 11 so that fertilizer can be applied at the same time the grass is being cut. This system preferably comprises a container 111 mounted on base plate 13 and provided with a chamber 113. Also, container 111 is provided with an opening 115 to chamber 113, which opening is normally closed with a removable cap 117. One end of a conduit 119 is in communication with chamber 113 and has a valve 121 interposed therein to control the flow through the conduit. The other end of conduit 119 is connected to a horizontally extending pipe 123 attached to the underside of base plate 13 and extending transversely thereof. The opposite ends of pipe 123 are closed and a plurality of apertures 125 extend through the pipe along the length thereof. It will be understood that the liquid fertilizer 125' is put in chamber 113 through opening 115. If desired, compressed air may be placed in the space 127 in chamber 113 above the liquid fertilizer so that it is forced downwardly through pipe 123 and out apertures 125 onto the ground as the lawnmower 11 is moved along the ground.

From the foregoing description it will be apparent that a very efficient lawnmower is provided which cuts the grass in a positive manner. In addition, it is apparent that a very unique arrangement is provided for a lawnmower which is self-sharpening and which provides many advantages over previous lawnmowers. Also, it is apparent that a unique fertilizer system-lawnmower combination is provided.

Although the invention has been described and illustrated with respect to a preferred embodiment thereof, it is to be understood that it is not to be so limited since changes and modifications may be made therein which are within the full intended scope of this invention as hereinafter claimed.

I claim:

1. A lawnmower comprising a base plate having a central portion, said base plate including a plurality of forwardly extending teeth adjacent the forward part of said base plate and a plurality of rearwardly extending teeth adjacent the rearward part of said base plate, an annular member having an enlarged central opening, said annular member including a plurality of arcuate teeth spaced around the periphery of said member and a circular gear adjacent said central opening having radially inwardly extending gear teeth, said annular member being rotatably mounted on top of said base plate with said central portion of said base plate being exposed by said central opening of said annular member and with said arcuate teeth positioned to co-act with said forwardly and rearwardly extending teeth when said annular member is rotated, said central portion being substantially a complete circle to provide an extensive circular supporting area bounded by said annular member, a bracket attached to said base plate and upstanding therefrom, said bracket including an arm horizontally extending in spaced relationship above said annular member, a carriage movably mounted on said arm, said carriage including an axle, a roller rotatably mounted on said axle, means co-acting between said arm and said carriage for urging said carriage downwardly to cause said roller to press downwardly on said annular member to hold said annular member against said base plate, wheel means attached to said base plate to rolling support said lawnmower for movement over the ground, and drive means mounted on said central portion of said base plate and including a gear engaging said circular gear for rotatably driving said annular member.

2. The structure of claim 1 in which each of said forwardly and rearwardly extending teeth are hollowed out to provide surfaces that are oppositely and upwardly inclined from adjacent the middle of each of said teeth towards the sides thereof and terminate in laterally spaced sharpened edges adapted to co-act with said arcuate teeth.

References Cited in the file of this patent

UNITED STATES PATENTS

| | | |
|---|---|---|
| 1,221,204 | Montague | Apr. 3, 1917 |
| 1,876,504 | Rossitter et al. | Sept. 6, 1932 |
| 2,448,091 | Gardner | Aug. 31, 1948 |
| 2,530,684 | Davis | Nov. 21, 1950 |
| 2,939,636 | Mullin | June 7, 1960 |